US008873909B1

(12) United States Patent
Wang et al.

(10) Patent No.: US 8,873,909 B1
(45) Date of Patent: Oct. 28, 2014

(54) MICRO-OPTIC FILTERING DEVICES AND METHOD OF MAKING THE SAME

(75) Inventors: Daoyi Wang, San Jose, CA (US); Shiping Zhang, Guang Dong (CN); Yao Li, Newark, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 215 days.

(21) Appl. No.: 13/452,934

(22) Filed: Apr. 23, 2012

(51) Int. Cl.
*G02B 6/32* (2006.01)
*G02B 6/46* (2006.01)
*G02B 6/293* (2006.01)

(52) U.S. Cl.
CPC .. *G02B 6/32* (2013.01); *G02B 6/46* (2013.01); *G02B 6/2937* (2013.01); *G02B 6/29368* (2013.01)
USPC .................................. 385/34; 385/31; 385/33

(58) Field of Classification Search
CPC ........................... G02B 6/2937; G02B 6/29368
USPC .......................................................... 385/34
See application file for complete search history.

(56) References Cited

U.S. PATENT DOCUMENTS

| | | | |
|---|---|---|---|
| 6,185,347 B1 * | 2/2001 | Zheng | 385/34 |
| 6,282,339 B1 * | 8/2001 | Zheng | 385/34 |
| 6,343,166 B1 * | 1/2002 | Hellman et al. | 385/31 |
| 6,347,170 B1 * | 2/2002 | Zheng | 385/34 |
| 6,353,691 B1 * | 3/2002 | Li et al. | 385/11 |
| 6,396,980 B1 * | 5/2002 | Liu et al. | 385/34 |
| 6,454,465 B1 * | 9/2002 | Uschitsky et al. | 385/79 |
| 6,582,135 B2 * | 6/2003 | Brun et al. | 385/78 |
| 6,701,040 B2 * | 3/2004 | Li et al. | 385/34 |
| 6,760,516 B2 * | 7/2004 | Brun et al. | 385/34 |
| 6,782,162 B2 * | 8/2004 | Fukuzawa et al. | 385/34 |
| 6,850,669 B2 * | 2/2005 | Hellman et al. | 385/33 |
| 6,907,163 B2 * | 6/2005 | Lewis | 385/33 |
| 6,925,227 B2 * | 8/2005 | Asano et al. | 385/34 |
| 7,103,246 B1 * | 9/2006 | Zhu et al. | 385/34 |
| 7,113,672 B2 * | 9/2006 | Wang | 385/34 |
| 7,194,160 B2 * | 3/2007 | Tanaka et al. | 385/33 |
| 7,440,652 B2 * | 10/2008 | Wang et al. | 385/34 |
| 7,672,551 B2 * | 3/2010 | Ji | 385/33 |
| 2003/0026540 A1 * | 2/2003 | Fukuzawa et al. | 385/34 |
| 2003/0044115 A1 * | 3/2003 | Lewis | 385/33 |
| 2003/0063853 A1 * | 4/2003 | Huang et al. | 385/34 |
| 2003/0072527 A1 * | 4/2003 | Li et al. | 385/34 |
| 2003/0103725 A1 * | 6/2003 | Li | 385/34 |
| 2003/0152327 A1 * | 8/2003 | Tanaka et al. | 385/34 |
| 2003/0185507 A1 * | 10/2003 | Lai et al. | 385/33 |
| 2004/0001713 A1 * | 1/2004 | Ting et al. | 398/48 |
| 2004/0086226 A1 * | 5/2004 | Hellman et al. | 385/33 |
| 2004/0091210 A1 * | 5/2004 | Tanaka et al. | 385/34 |
| 2005/0008292 A1 * | 1/2005 | Wang et al. | 385/33 |
| 2006/0067613 A1 * | 3/2006 | Wang | 385/24 |
| 2006/0067614 A1 * | 3/2006 | Wang | 385/24 |
| 2006/0159390 A1 * | 7/2006 | Ito | 385/17 |
| 2006/0182390 A1 * | 8/2006 | Ji | 385/31 |
| 2007/0081765 A1 * | 4/2007 | Wang | 385/34 |
| 2013/0330039 A1 * | 12/2013 | Liu et al. | 385/33 |

* cited by examiner

*Primary Examiner* — Rhonda Peace
(74) *Attorney, Agent, or Firm* — Wuxi SinoIP Agency, Ltd.; Joe Zheng

(57) ABSTRACT

Micro-optic filtering devices and the method of making the same are described. In one aspect, the invention is related to techniques of obtaining low-loss coupling optics, packaging structure and process to secure components constituting a micro-optic fiber device. To support and fix various components in a fiber optic device, tubes are used to facilitate the manufacturability of these optical devices. These tubes may be metal tubes or glass tubes.

20 Claims, 16 Drawing Sheets

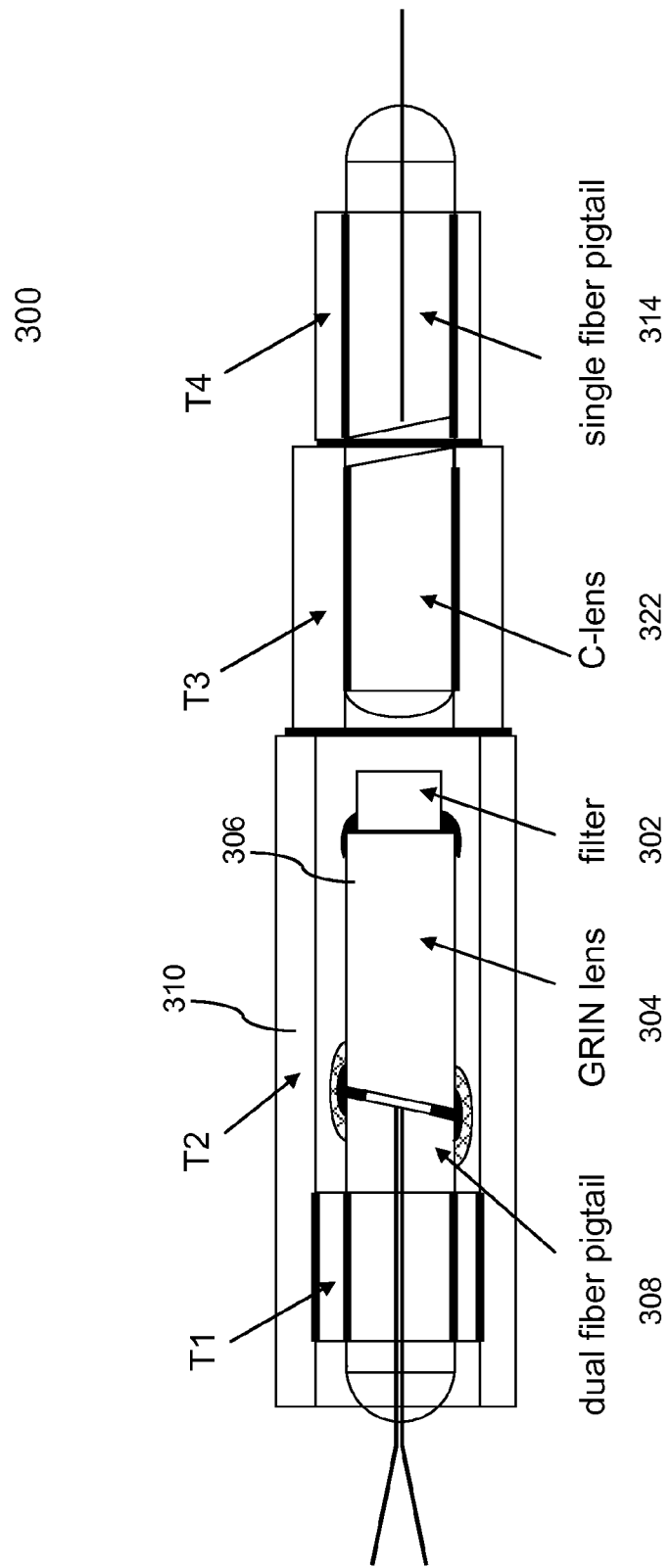

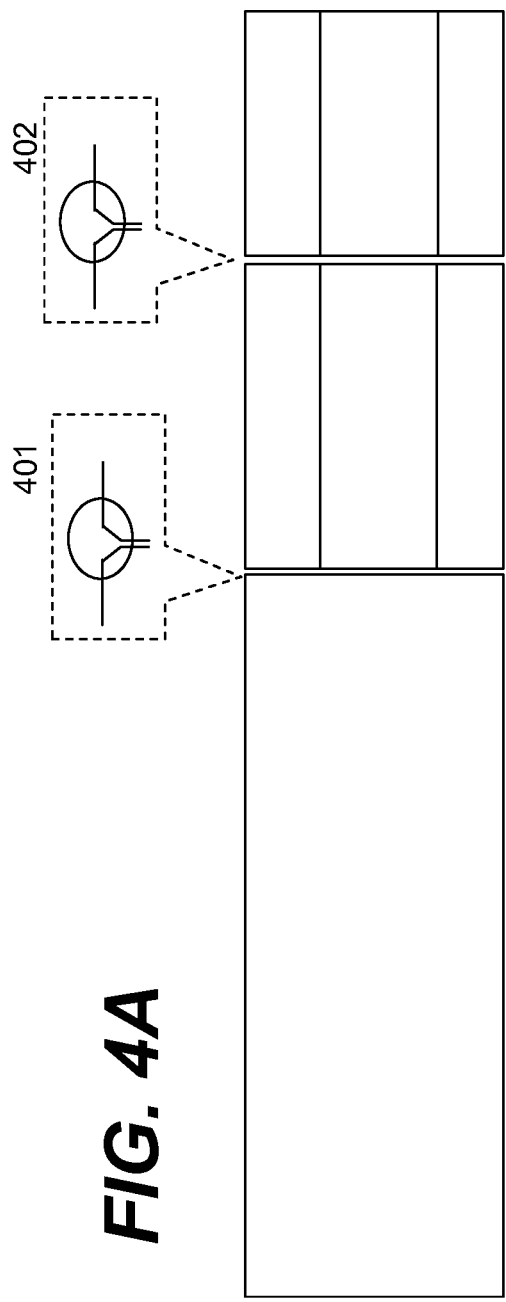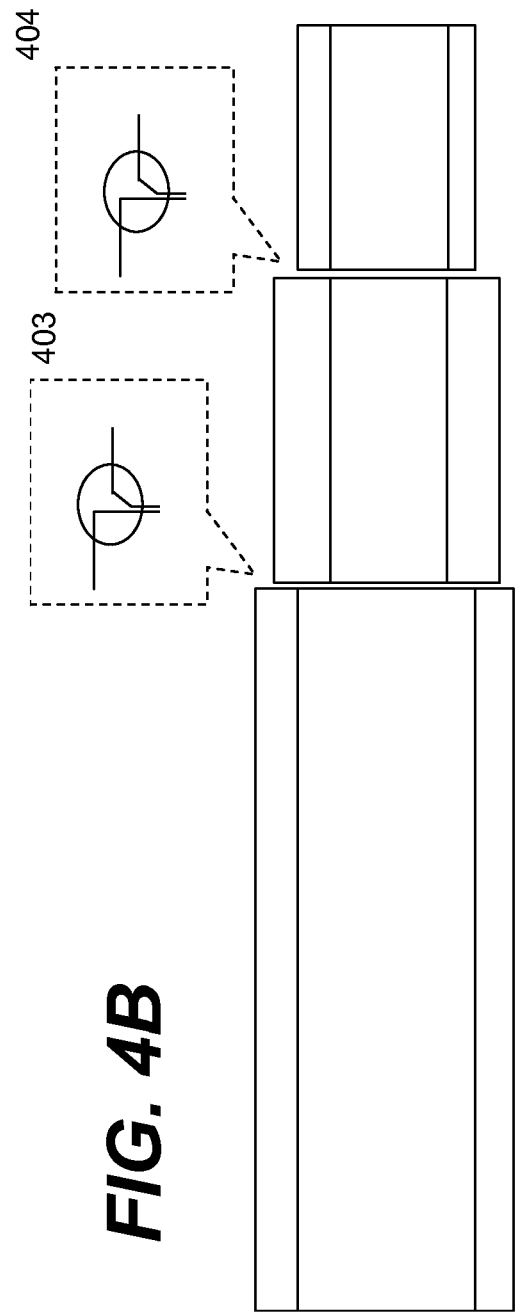

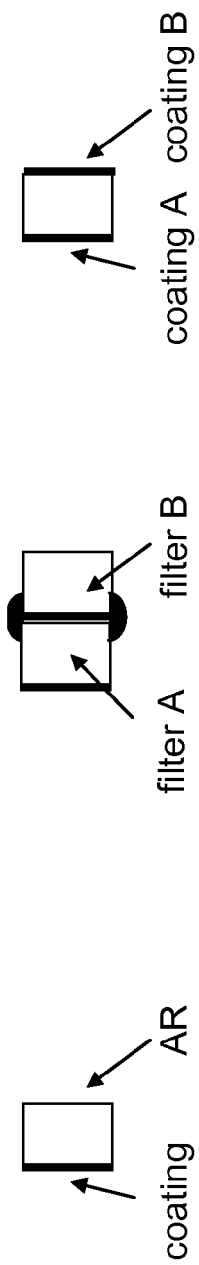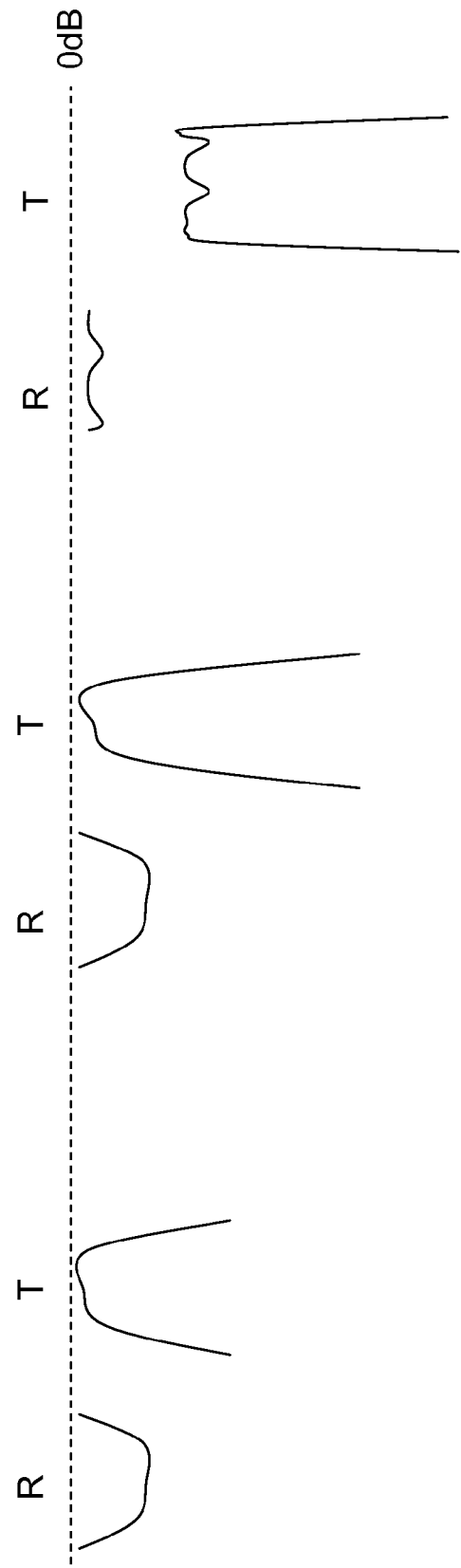
FIG. 12
FIG. 13

MICRO-OPTIC FILTERING DEVICES AND METHOD OF MAKING THE SAME

BACKGROUND OF THE INVENTION

1. Field of the Invention

The invention is generally related to the area of optical systems and devices. In particular, the invention is related to micro-optic devices and the method of making the same. More particularly, the invention is related to techniques of obtaining low-loss coupling optics, packaging structure and process to secure components constituting a micro-optic fiber device.

2. The Background of Related Art

The most commonly used approach to making a micro-optic fiber device is to make two fiber collimators separately and then insert one or more optical processing elements such as WDM filters, isolator cores, polarization beam combiners, circulator cores in between. In a typical prior art assembly process, the optical processing elements are attached to either the first collimator or the second collimator by using soldering or epoxy bonding. The resultant sub-assembly is then aligned and bonded with the other collimator. FIG. 1 shows a traditional soldering structure. There are two additional sleeves 106 and 20 used to hold two collimators and link them together with an outer housing by soldering.

With soldering, the devices built suffer from high thermal-dependent loss and insertion loss due to residual stress. With traditional epoxy bonding, epoxy can flow into the optical path, resulting in bad optical performance and poor reliability.

FIG. 2 replicates FIG. 2 of U.S. Pat. No. 6,282,339 in which a dual fiber collimator and a single fiber collimator are used to make a WDM device. A WDM filter is first attached to a GRIN lens of the first collimator. Then the sub-assembly is inserted into a first glass tube and fixed. A dual fiber pigtail is then aligned with this sub-assembly to the minimum reflection loss and then connected to the sub-assembly through a second glass tube, resulting in a dual fiber collimator. For the transmission side, a secondary GRIN lens and a single fiber pigtail are inserted and glued in a third glass tube, and a fourth glass tube, respectively. Two glass tubes are fixed by their end-faces after being aligned with the dual fiber collimator. Finally, two collimators are aligned and bonded at the glass tube end-faces. The structure is simple but not stable with temperature change, especially on the dual fiber collimator side. The gap between the dual-fiber pigtail and the GRIN lens cannot be too small in the configuration, leading to a high defocusing loss.

The present disclosure provides a cost-effective and low loss solution to overcome at least these issues identified in the prior art. The reflection low loss is achieved by minimizing the defocusing of an optical lens (e.g., a GRIN lens). The transmission loss is minimized by using a matching lens with the GRIN lens.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to micro-optic devices and the method of making the same. In one aspect, the invention is related to techniques of obtaining low-loss coupling optics, packaging structure and process to secure components constituting a micro-optic fiber device. To support and fix various components in a fiber optic device, tubes are used to facilitate the manufacturability of these optical devices. These tubes may be metal tubes or glass tubes. Metal tubes have the advantages of making complicated structure while glass tubes are transparent, better for light curing epoxies (for example, UV light curing). Light cured devices take less position shift during curing compared to thermally cured devices. There is no cooling procedure after devices are aligned and fixed.

Various assembling processes described herein make the assembly of the optical devices easier thus reducing cost and providing more accuracy and durability. The present invention may be implemented as an apparatus, a method or a part of a system. According to one embodiment, the present invention is a method for making an optical device. The method comprises: attaching a filter to a first lens by a type of adhesive to form a first sub-assembly; aligning the first sub-assembly with a dual fiber pigtail to obtain in such a way that an insertion loss is minimized when a light beam travels from one fiber to an other in the dual fiber pigtail, wherein the first sub-assembly and dual fiber pigtail are bonded to form a dual fiber collimator, and inserted into a first tube; attaching a second lens and a single fiber pigtail by a type of adhesive to form a second sub-assembly; aligning the first and the second sub-assemblies to achieve optimal beam lateral position matching and tilting angle alignment so as to minimize an insertion loss; and bonding together the first tube and a second tube containing the second lens to form the optical device.

According to another embodiment, the present invention is an optical device comprising: a first sub-assembly including a filter and a first lens bonded by a type of adhesive; a first tube including a dual fiber collimator formed by aligning the first sub-assembly with a dual fiber pigtail to obtain in such a way that an insertion loss is minimized when a light beam travels from one fiber to an other in the dual fiber pigtail; a second sub-assembly including a second lens and a single fiber pigtail bonded by a type of adhesive, wherein the first and the second sub-assemblies are properly aligned to achieve optimal beam lateral position matching and tilting angle alignment so as to minimize an insertion loss; and wherein the first tube and a second tube containing the second lens are bonded together to form the optical device.

There are numerous benefits, features, and advantages in the present invention. These benefits, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3 shows an exemplary two-port optical device according to one embodiment of the present invention;

FIG. 4A and FIG. 4B show, respectively, chamfers at tube edges to improve the epoxy contact;

FIG. 9 shows an embodiment of replacing the tube T1 and the tube T2 with a pigtail holder;

FIG. 10 shows that a C-lens 902 is smaller than the dual fiber pigtail 904 and the filter 906. The C-lens 902 and the filter 906 can be held with a tube T5, forming a sub-assembly;

FIG. 12 demonstrates different filter and filter combinations, where the filter can be of a regular filter with functional coating on one side thereof with anti-reflection (AR) coating on the other side;

FIG. 13 shows some functional spectrums corresponding to the filter settings shown in FIG. 12;

DESCRIPTION OF THE PREFERRED EMBODIMENTS

Figure 1:
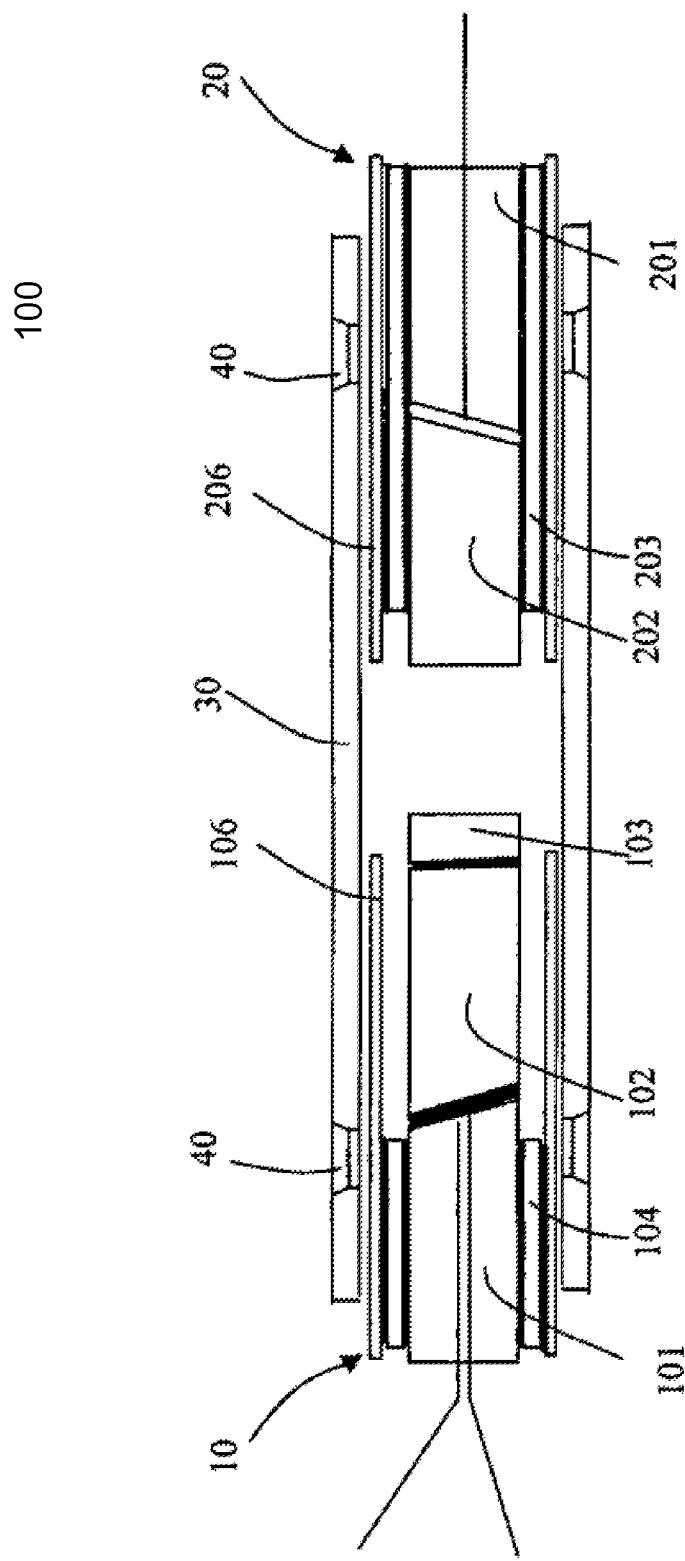
FIG. 1 shows a traditional soldering structure with two sleeves used to hold two collimators and link them together with an outer housing by soldering.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 3-17. However, those skilled in the art will readily appreciate that the detailed description given herein with respect to these figures is for explanatory purposes as the invention extends beyond these limited embodiments.

FIG. 3 shows an exemplary two-port optical device 300 according to one embodiment of the present invention. According to one embodiment, a filter 302 is first attached to a GRIN lens 304 by epoxy butt bonding, forming a G+F sub-assembly 306. Then the G+F sub-assembly 306 is aligned with a dual fiber pigtail 308 to obtain the minimal insertion loss from one fiber to the other in the dual fiber pigtail 308, and then fixed by epoxy, forming a dual fiber collimator 310. The epoxy flows along the outer ring of the gap between the pigtail and the collimator, and a small portion of the outer cylinders of the two components. To increase the bonding strength, a second layer of epoxy may be applied onto the first epoxy body. For the optimal epoxy thickness, the pitch of the GRIN lens 304 is properly designed. 0.248 pitch or similar to that is commonly used. In general, the defocusing loss caused by the minor difference between pitch of the GRIN lens and ideal ¼ pitch is ignorable.

After the dual fiber collimator assembled, a small tube T1 is slid in and fixed at the dual fiber pigtail cylinder, close to the pigtail-collimator junction. After that, the tube T1, together with dual fiber collimator, is inserted into tube T2, and glued along its outer cylindrical surface by a type of adhesive (e.g., epoxy).

On the single fiber collimator side, a C-lens 312 and a single fiber pigtail 314 are first fixed within two supporting tube T3 and T4, respectively. Then the two sub-assemblies are aligned with the dual fiber collimator for the optimal beam lateral position matching and tilting angle alignment, equivalently to minimize the minimal insertion loss. Finally the tube T3 is bonded with the tube T2 at the butt. The tube T4 is bonded with the tube T3 in a similar manner. In general, a 3-axis lateral alignment is enough to make two sub-assemblies move to the best position.

For demultiplexing operation, a signal (i.e., a light beam) for a common port is coupled to the GRIN lens 304 by the dual fiber pigtail. At the GRIN lens 304, the beam is collimated and travels to the filter 302. The filter 302 separates the light based on its characteristic wavelength spectrum. The in-band signals pass the filter 302 and hit the C-lens 312 of the single fiber collimator, then are focused to the output fiber. The out-of-band signals are reflected by the filter 302, pass the GRIN lens 302 again, and are then focused to a reflection port fiber in the dual fiber pigtail. In this manner, the input signal is separated into two portions according to its wavelength bands: reflection and transmission. Similarly, the multiplexing operation is the reverse of demultiplexing.

Figure 2:
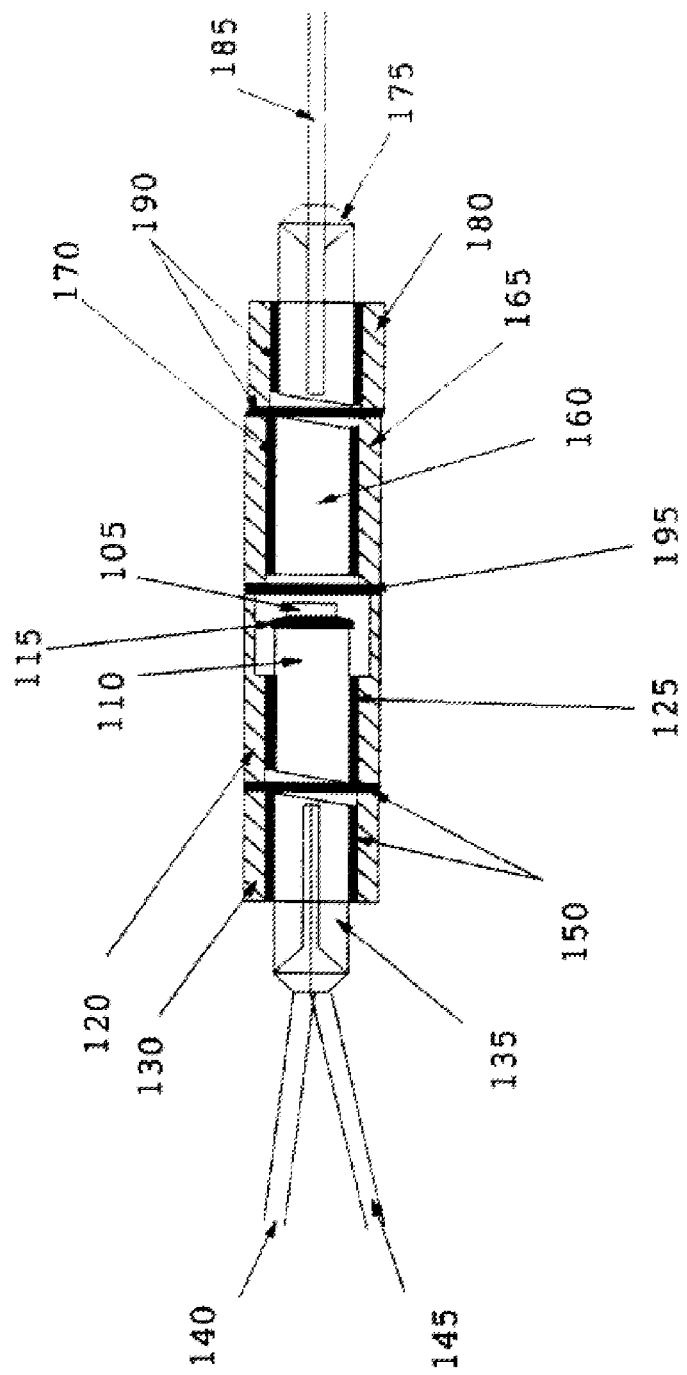
FIG. 2 replicates FIG. 2 of U.S. Pat. No. 6,282,339 in which a dual fiber collimator and a single fiber collimator are used to make a WDM device.

Compared with the prior art shown in FIG. 2, the embodiment of FIG. 3 in the present invention has lower reflection channel loss. In the prior art, due to structural limitation, the gap between the dual fiber pigtail and the GRIN lens cannot be too small. Then the optical system is not symmetrical, defocusing leads to a high-insertion loss. Moreover, from the dual fiber pigtail to the GRIN lens, three connecting interfaces are involved, more sensitive to the ambient temperature change. While for the embodiment of the present invention as shown in FIG. 3, the gap can be small enough to reduce the defocusing loss to the ignorable level, and there are only one connecting interface exists between the pigtail and the GRIN lens.

On the single fiber collimator side, unlike the prior art, the embodiment of the present invention as shown in FIG. 3 uses a C-lens 312 to save cost, although a GRIN lens is also applicable. The tubes are not necessarily the same in the outer diameters as shown in the prior art. With different diameters for adjacent tubes, there is a step structure convenient to epoxy holding and with bigger bonding area. Besides the step designs, chamfers at the tube edges are also applicable to further improve the epoxy contact as shown in FIG. 4A and FIG. 4B, respectively. The chamfers 401-404 are not a must feature for step diameter design. But for equal diameter design, the chamfers can increase the manufacturibility and structural stability.

Referring back to FIG. 3, in one embodiment, the supporting tube T1 for the dual fiber collimator is at the pigtail. This configuration isolates the reflection channel inside the big housing tube T2. Thus the reflection channel performance is not sensitive to ambient factors and the sealing is excellent to resist moisture. One minor issue is that the weight of the GRIN lens 304 and filter 302 rely on the epoxy wrap between the pigtail 308 and the GRIN lens 304, requiring strong bonding strength.

Figure 5:
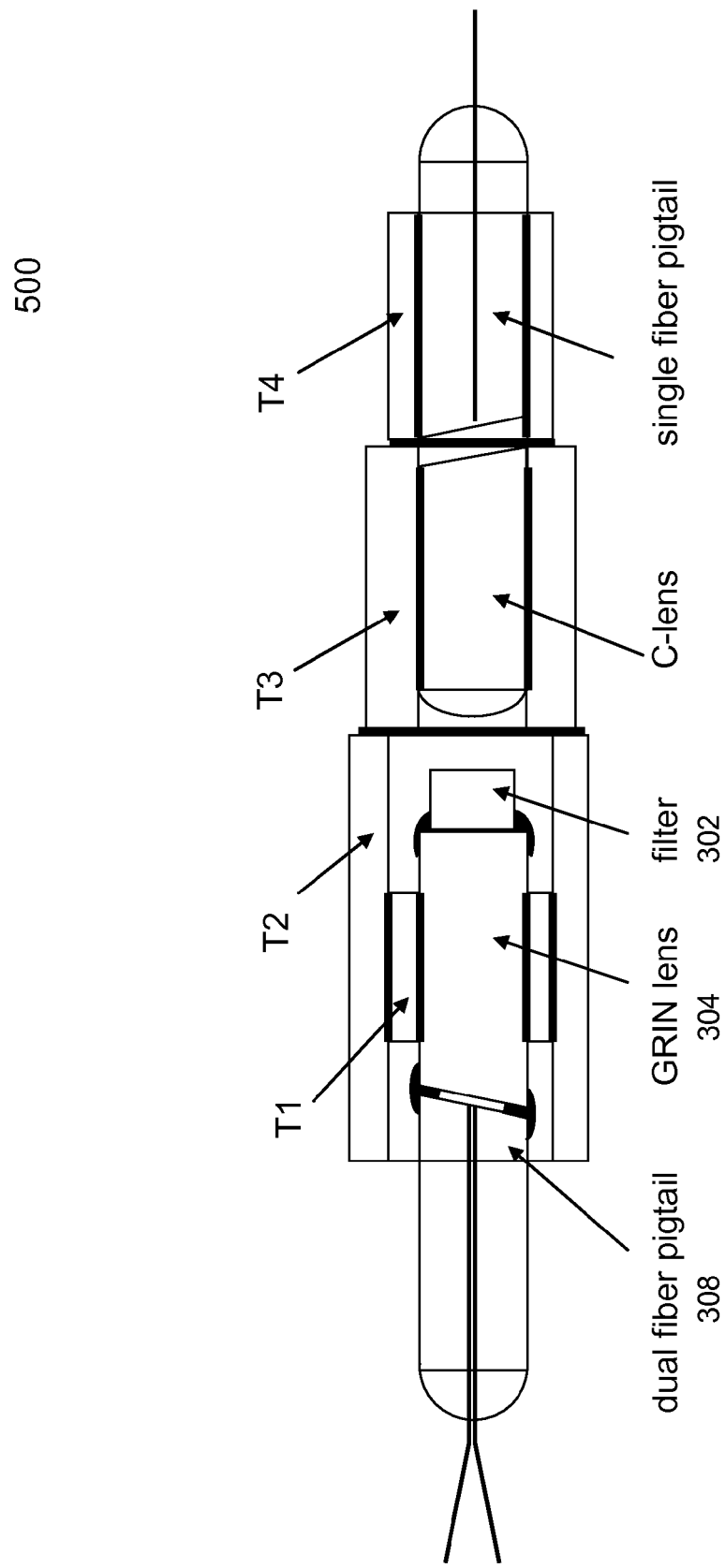
FIG. 5 shows an improved embodiment of the present invention to improve a weight distribution to support a GRIN lens and a filter bonded with epoxy.

To improve the weight distribution, the supporting tube T1 is moved to the outer cylindrical surface of the GRIN lens 304, as shown in FIG. 5 according to one embodiment. At the very beginning of assembling, the tube T1 is glued with the GRIN lens 304. In this design, the GRIN lens 304 and filter 302 are well held. The fiber side of the dual fiber pigtail is retained by the device housing tube, which is not shown in FIG. 5. The side effect is that the critical epoxy ring between the pigtail 308 and the GRIN lens 304 is exposed to external strength, temperature change, and moisture. These issues can be solved by a device housing.

Figure 6:
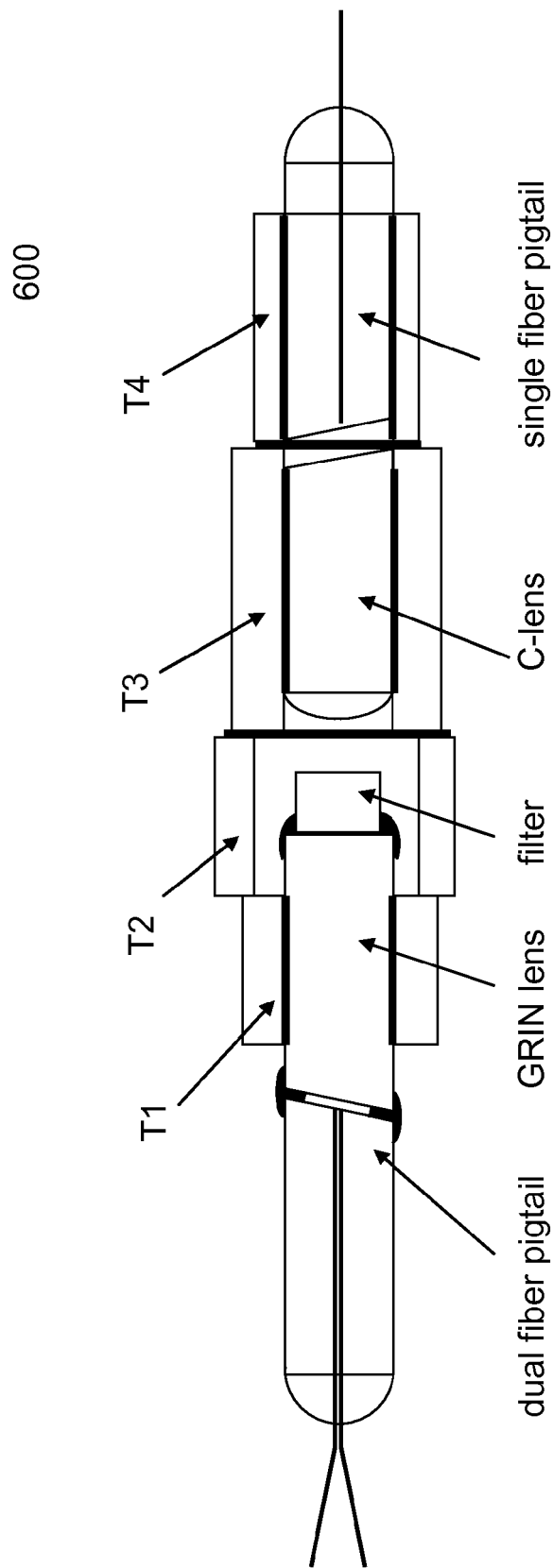
FIG. 6 shows a similar structure to replace a cylindrical link between two tubes with butt bonding.
Figure 7:
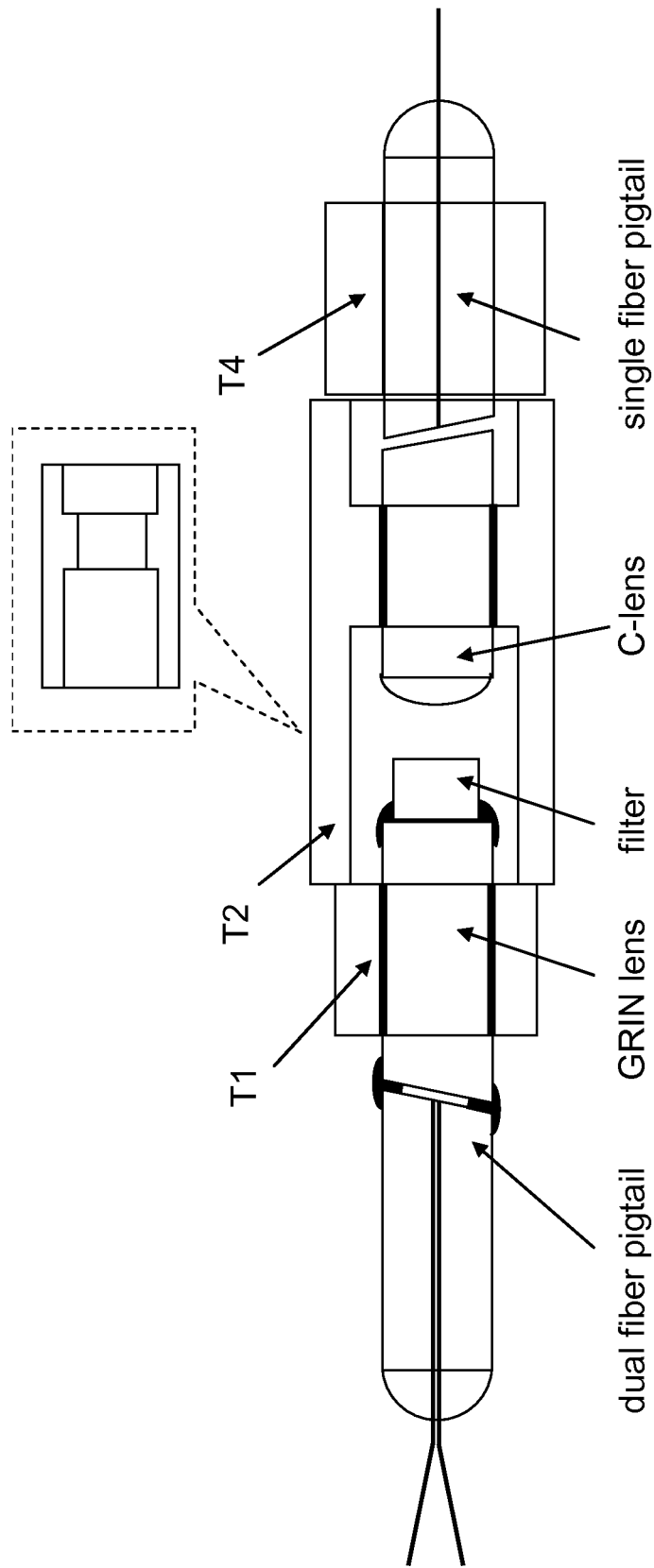
FIG. 7 shows an embodiment with a tube merged with a larger tube to form a holder.

FIG. 6 shows a similar structure 600 to replace the cylindrical link between the tube T1 and T2 with butt link. The design in FIG. 6 takes more alignment flexibilities as the sub-assemblies on both sides, left and right, of the tube T2 can be laterally adjusted. As shown in FIG. 7, the tube T3 is merged with the large tube T2, forming the holder T2. When adjusting the single fiber side, three pieces of sub-assemblies are on the alignment stages. In operation, one piece is mounted to a fixed stand, then the other two pieces can be moved along with two 3-axis stages to obtain the minimum insertion loss. A significant advantage of this design is the easy epoxy control as the link position between the C-lens and the single fiber pigtail is shifted from the epoxy position. Due to the elimination of the epoxy interface between T2 and T3 shown in FIG. 6, the structural stability is improved, resulting in lower temperature-dependent loss.

Figure 8:
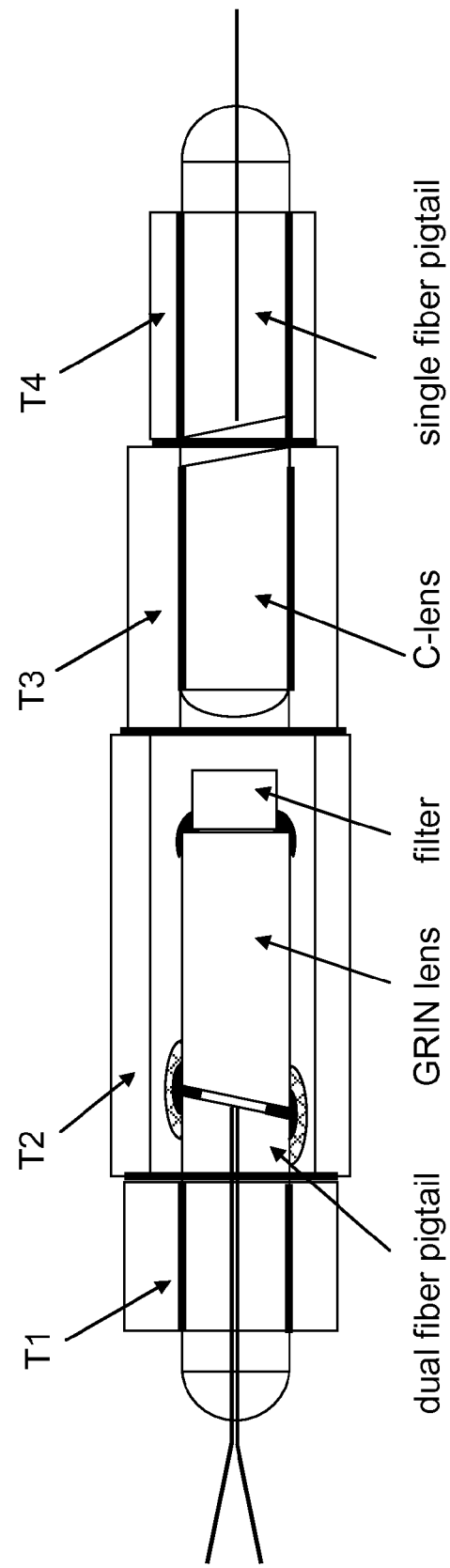
FIG. 8 and FIG. 9 show various variations in embodiments of the present invention, where FIG. 8 moves tube T1 out of T2 and links the two tubes through their end-faces.
Figure 9:
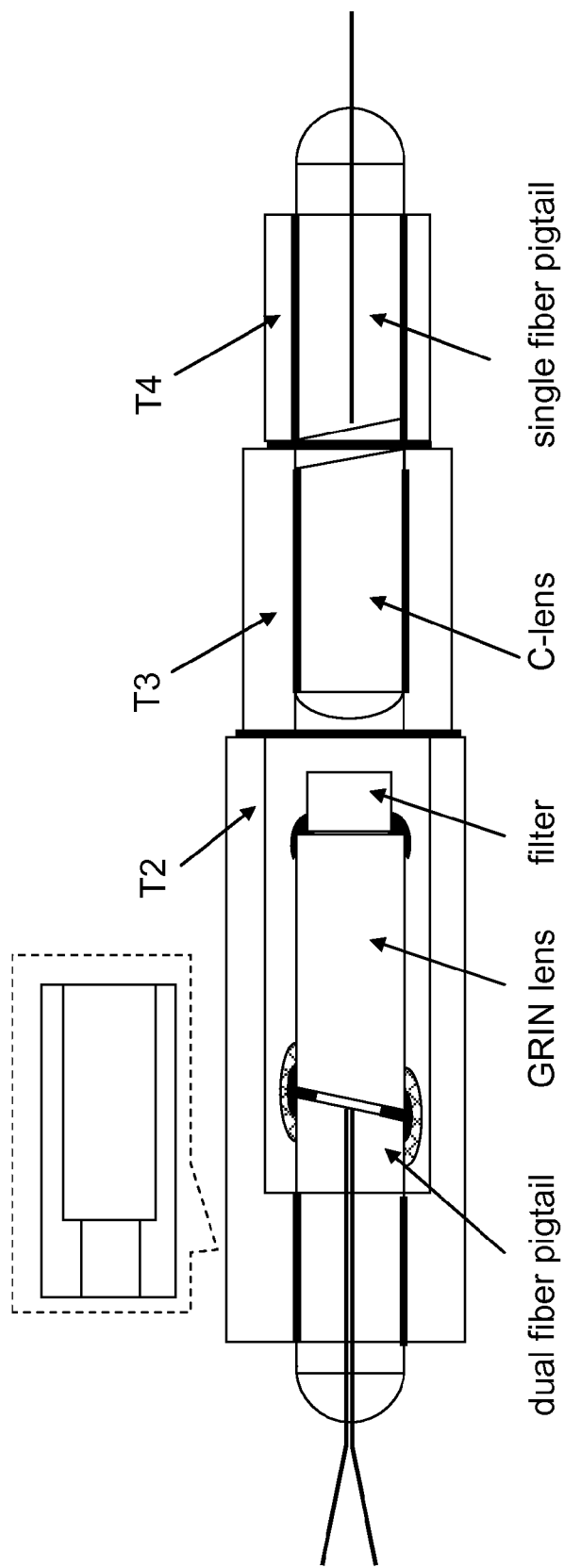

FIG. 8 and FIG. 9 show other variations in embodiments of the present invention. The embodiment of FIG. 8 moves the tube T1 out of T2, and links the two tubes through their end-faces, instead of cylindrical surfaces.

FIG. 9 shows another embodiment to simplify the embodiment of FIG. 3 by replacing the tube T1 and the tube T2 with a pigtail holder. It is a relatively cheaper solution as the amount of the supporting components is reduced from 4 to 3. Due to the reduction of epoxy linking interfaces, the structure stability is improved, resulting in lower temperature dependent loss.

It should be noted that all the C-lenses in the above embodiments can be replaced with other type of lenses, such as a GRIN lens, or a drum lens, without sacrificing the performance. Similarly, the GRIN lens in theses embodiments can also be replaced with other types of lenses. As the GRIN lenses have a flat surface in nature, the filter can be directly attached to this surface. For other types of lenses, some extra supporting structures may be required to retain the optical system.

Figure 10:
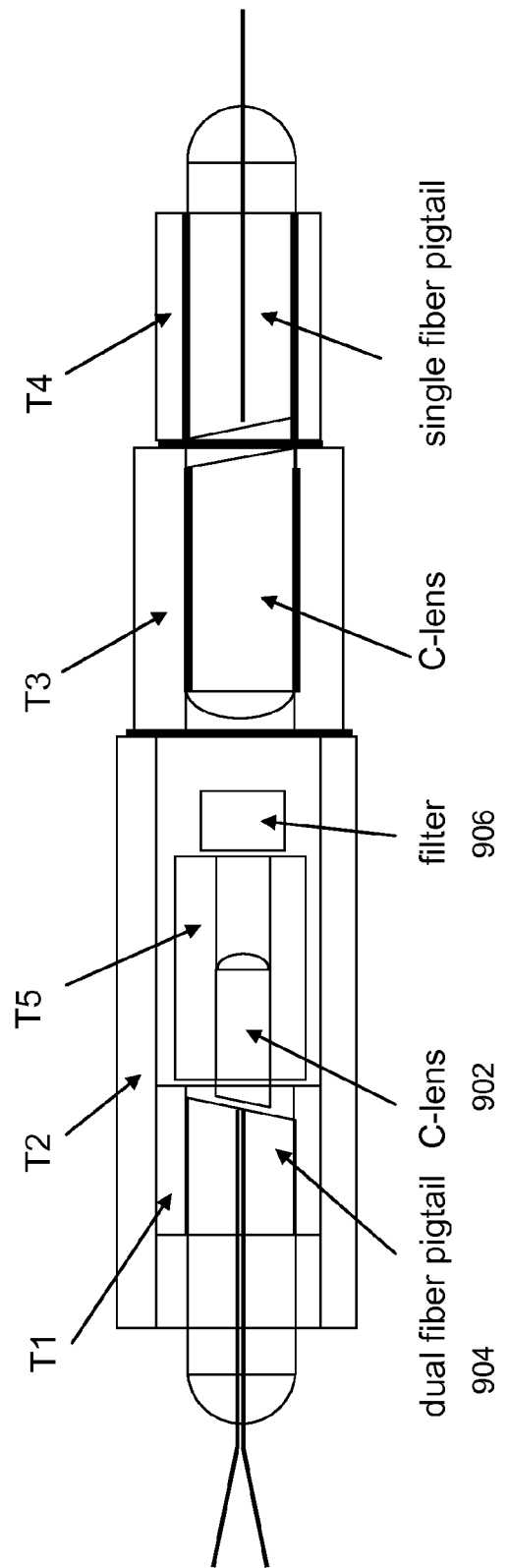
FIG. 10 shows that a C-lens is smaller than the dual fiber pigtail and the filter.

FIG. 10 shows that a C-lens 902 is smaller than the dual fiber pigtail 904 and the filter 906. The C-lens 902 and the filter 906 can be held with a tube T5, forming a sub-assembly. Then the sub-assembly is aligned with the dual fiber pigtail 904 and fixed with it through its supporting tube T1. The space length in the hole of the tube T5 assures the filter reflection surface is located at the focal point of the C-lens to obtain the lowest reflection channel insertion loss.

Figure 11:
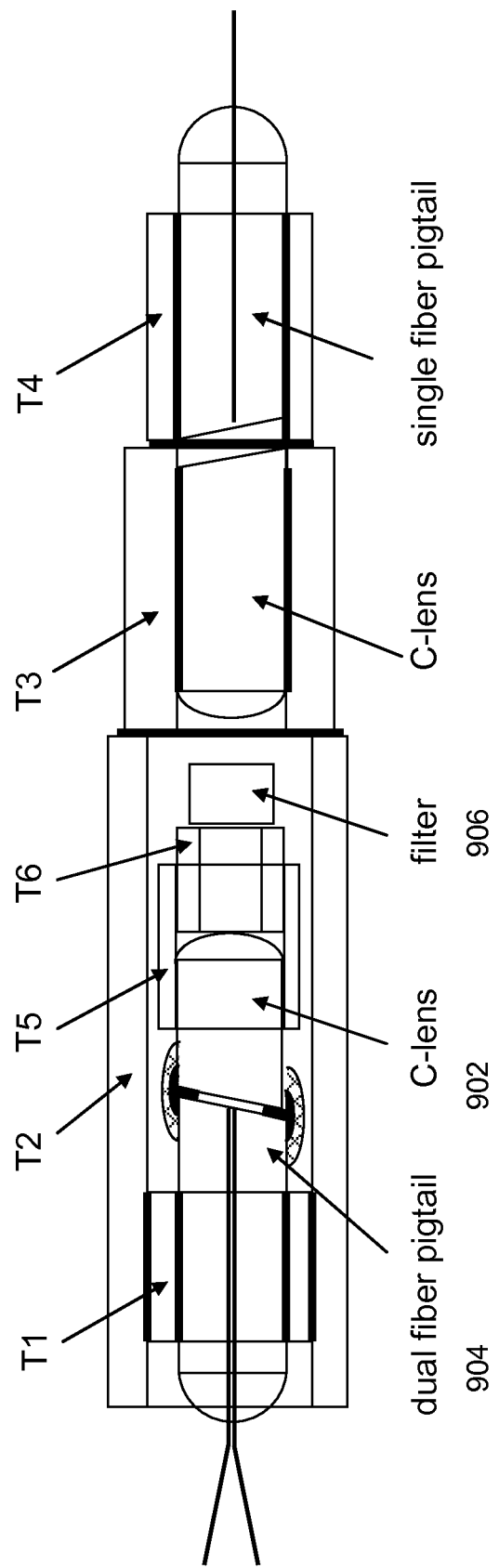
FIG. 11 shows that a C-lens is regular in size and bonded with a dual fiber pigtail by epoxy, similar to the use a GRIN lens in other embodiments.

FIG. 11, however, shows that the C-lens 902 is regular in size and bonded with the dual fiber pigtail 904 by epoxy, similar to the use a GRIN lens in other embodiments. Before aligning and bonding, the filter 906 is attached to the C-lens 902 with two supporting tubes T5 and T6. Again, these two tubes can be replaced with a simple filter holder.

The present invention provides a packaging structure to obtain and retain low loss coupling for micro-optic devices. For the optics, the package template has enough flexibility for the adjustment to achieve the optimal performances and secure the aligned structure. As far as the applications are concerned, the package template is not limited to WDM devices. Those skilled in the art may appreciate that the description herein may also be applicable to other types of optical processing elements. For example, in the dimension, the package template can hold big and/or long elements inside the container tube T2.

Further, the filters mentioned in the present disclosure are not limited to WDM filters. Other types of filters, for example, tap filters, Gain Flattening Filters (GFF) are also applicable, and one or more filters may be incorporated. By design, the present invention provides a packaging template to contain various optical processing elements.

FIG. 12 demonstrates different filter and filter combinations. The filter can be of a regular filter with functional coating on one side thereof with anti-reflection (AR) coating on the other side. Two or more filters may be bonded together by light curing epoxies. Even for one filter, two different types of coating can be deposited on its both sides of an optical substrate. All these element and combination are compatible with the package structure described with the present disclosure.

FIG. 13 shows some functional spectrums corresponding to the filter settings shown in FIG. 12. For a regular bandpass filter (coating plus AR), the reflection and transmission spectrums are complementary (R+T=1). If another identical filter is bonded after the filter or another coating is deposited on a back surface, then the overall reflection spectrum keeps the same, while the transmission spectrum becomes steeper with higher isolation over the adjacent channels. In addition, the incidence surface (or incidence filter) can be deposited with one functional coating (e.g., tap), the other surface (or the attached filter) can be deposited with another functional coating (e.g., bandpass). Then the reflection spectrum is still a regular tap spectrum, while the transmission spectrum is the overlap of tap spectrum, complementary to the reflection spectrum, and the bandpass spectrum, resulting in a tap spectrum with a clearance wavelength band.

Figure 14:
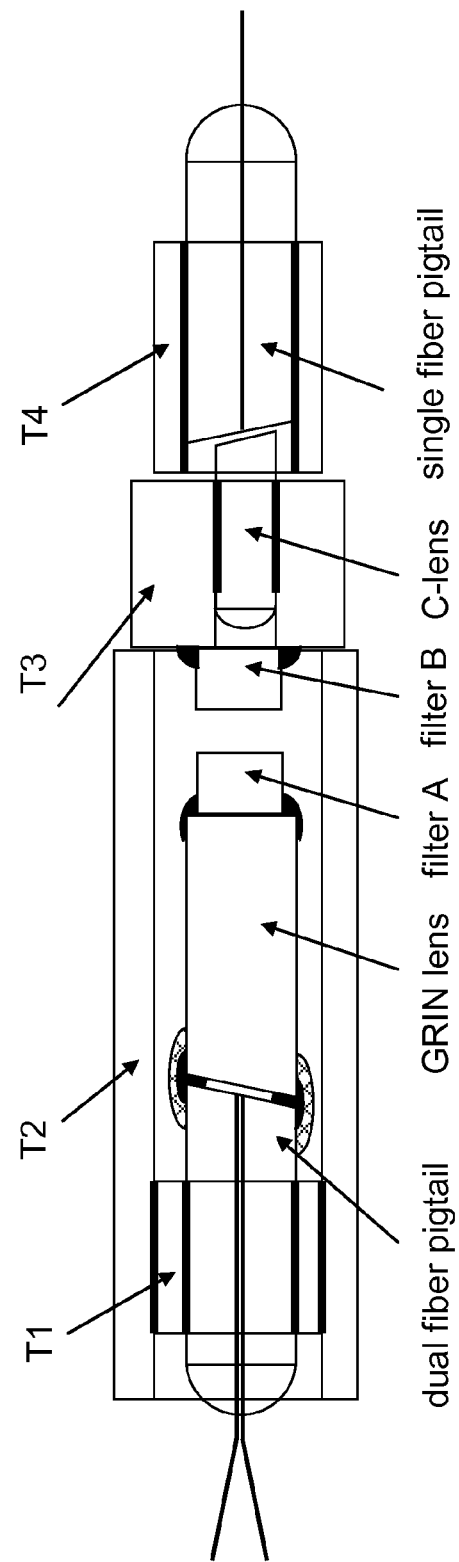
FIG. 14 shows an example of using multiple filters.

Besides the filter combination shown in FIG. 12, the packaging structure of the present invention allows for two filters mounted to different support surfaces. An example is depicted in FIG. 14. A secondary filter (Filter B) is bonded to the tube T3 before the C-lens of the transmission side collimator is bonded thereto.

Figure 15:
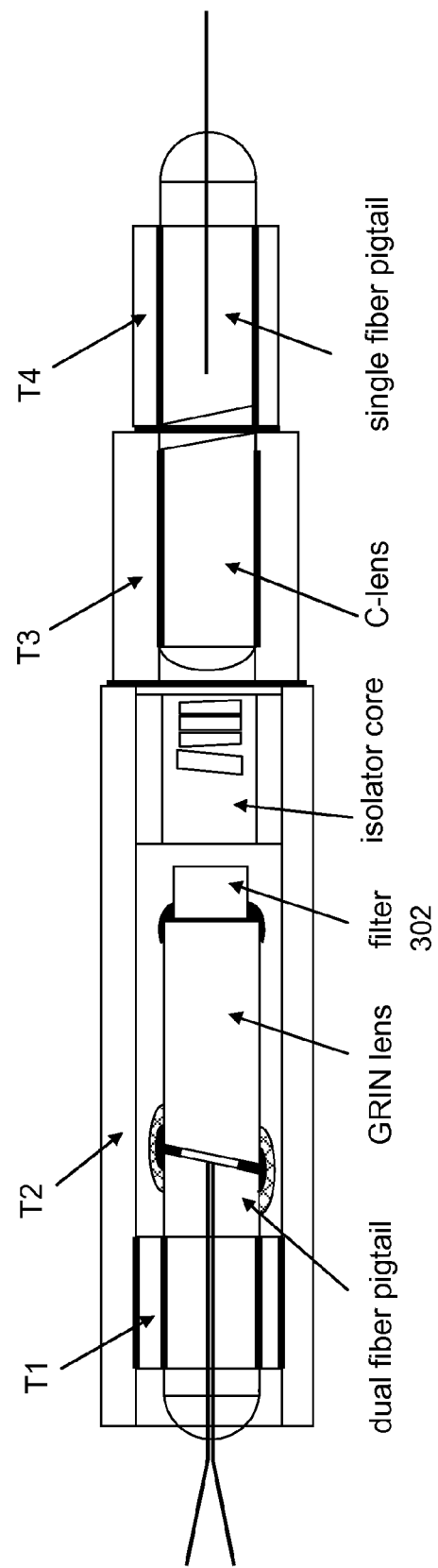
FIG. 15 shows that an isolator core may be inserted after the filter in FIG. 3 to block the backward noise, forming an isolator WDM (IWDM) device.

In addition to different filter types, other optical processing elements are also applicable to the packaging structure of the present invention. An isolator core may be inserted after the filter 302 in FIG. 3 to block the backward noise, forming an isolator WDM (IWDM) device as shown in FIG. 15. In the IWDM device, the signal is desired to transfer from the single fiber pigtail to the common port of the dual fiber pigtail, not from the reversed direction. If the filter 302 in FIG. 15 is a Gaining Flattening Filter (GFF), then the device would function as an isolator GFF.

Figure 16:
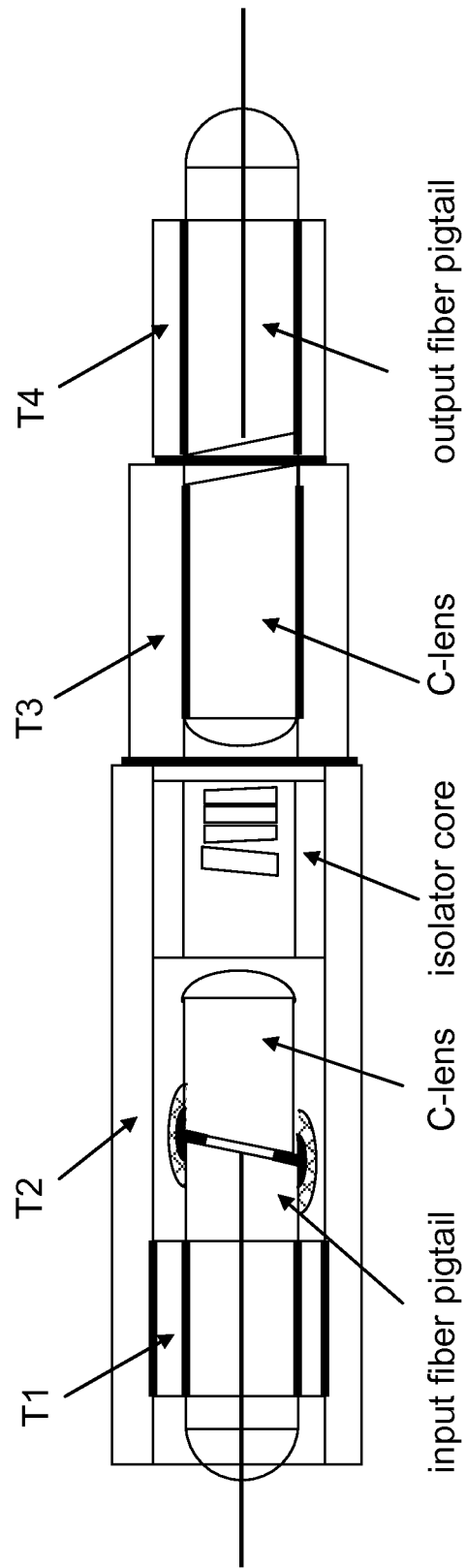
FIG. 16 shows how a packaging structure or a micro-optic system contemplated in the present invention is modified to be an isolator device.

Without the WDM filter 302, therefore no the reflection optical path, the packaging structure or the micro-optic system would be an isolator device as shown in FIG. 16. From the input fiber to the output side, the light is transmissive while for the reversed direction, i.e., from the output to the input, the light is blocked.

Figure 17:
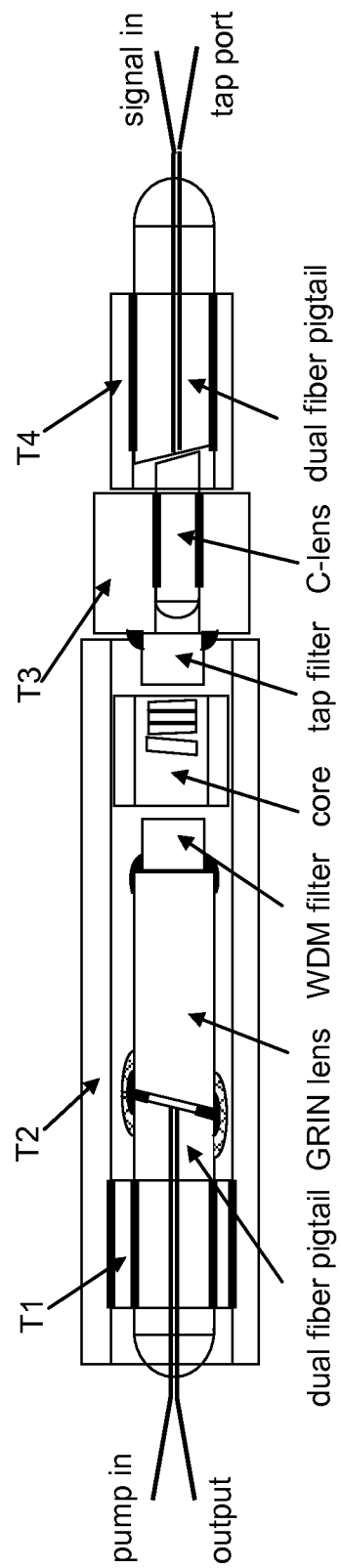
FIG. 17 shows an embodiment in which a single fiber pigtail is replaced with a dual fiber pigtail, thus forming another reflection optics on one side.

In one embodiment, the single fiber pigtail is replaced with a dual fiber pigtail, thus forming another reflection optics on one side. As shown in FIG. 17, a light beam enters the dual fiber pigtail one the right side, is collimated by the C-lens, and hits the tap filter, which reflects a small portion of signal back to tap port of the dual fiber pigtail. The major portion of light passes through the tap filter, then the isolator core, the WDM filter, finally is coupled out to the output port of the dual fiber pigtail at the left side. On the other hand, the input pump light is directly reflected by the WDM filter and enters the output port. The whole device is a hybrid tap/WDM/isolator.

In summary, the present disclosure provides a packaging structure and its extensions to obtain and retain low loss coupling for various micro-optic devices. In these packaging structures, the input collimator, the output collimator, and the optical processing elements, are aligned and well secured.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for manufacturing an optical device, the method comprising:
    attaching a filter to a first lens by a type of adhesive to form a first assembly;
    aligning the first assembly with a dual fiber pigtail in such a way that an insertion loss between the first assembly and the dual fiber pigtail is minimized when a light beam travels from one fiber to another in the dual fiber pigtail, wherein the first assembly and the dual fiber pigtail are bonded to form a dual fiber collimator;
    inserting the dual fiber collimator into a first tube until the first tube covers the dual fiber pigtail;
    sliding a second tube over the first tube, wherein the second tube is substantially longer than the first tube to encapsulate the first tube and the first assembly;
    attaching a second lens and a single fiber pigtail by a type of adhesive to form a second assembly;
    aligning the first and the second assemblies to achieve optimal beam lateral position matching and tilting angle alignment so as to minimize an insertion loss between the first and the second assemblies; and
    bonding together the first tube and a third tube containing the second lens to form the optical device, wherein the first tube and the third tube are different in diameters so that the second tube and the third tube are connected coaxially.

2. The method as recited in claim 1, wherein the single fiber pigtail is inserted in a fourth tube.

3. The method as recited in claim 2, wherein said bonding together the first tube and a third tube comprises:
    aligning the first and the third tube in such a way that an insertion loss between the first and the third tubes is minimized; and
    bonding the first and third tubes together.

4. The method as recited in claim 3, wherein the first tube and the third tube are different in diameters.

5. The method as recited in claim 4, wherein a 3-axis lateral alignment is applied to ensure that the first tube and the third tube or the second tube and the third tubes are perfectly positioned.

6. The method as recited in claim 4, wherein chamfers around tube edges of the first, second or third tube are formed to provide better contact for the adhesive.

7. The method as recited in claim 1, wherein the first tube fixed on the dual fiber pigtail is used to ensure that the first lens is in no contact with any physical objects but protected by the second tube.

8. The method as recited in claim 7, wherein the first lens is a GRIN lens, and the second lens is a C-lens.

9. The method as recited in claim 7, wherein the first assembly further includes another tube besides the first tube, the first tube is used to support the first lens while the another tube is different from the first tube in diameter.

10. The method as recited in claim 1, further comprising: inserting one or more isolator cores between the filter and the second lens to block backward noise, forming an isolator WDM (IWDM) device.

11. The method as recited in claim 1, wherein the filter is a composite filter formed by more than one filter coatings on one or more substrates to achieve desired optical characteristics.

12. An optical device comprising:
    a first assembly including a filter and a first lens bonded together by a type of adhesive;
    a first tube including a dual fiber collimator formed by aligning the first assembly with a dual fiber pigtail in such a way that an insertion loss between the first assembly and the dual fiber pigtail is minimized when a light beam travels from one fiber to another in the dual fiber pigtail, wherein the first tube is fixed on the dual fiber pigtail;
    a second tube substantially longer than the first tube to encapsulate the first tube and the first assembly;
    a second assembly including a second lens and a single fiber pigtail bonded together by a type of adhesive, wherein the first and the second assemblies are properly aligned to achieve optimal beam lateral position matching and tilting angle alignment so as to minimize an insertion loss between the first and the second assemblies; and
    wherein the first tube and a third tube containing the second lens are different in diameters and bonded together to form the optical device.

13. The optical as recited in claim 12, wherein the single fiber pigtail is inserted in a fourth tube.

14. The optical device as recited in claim 12, wherein the first tube and the third tube are different in diameters.

15. The optical device as recited in claim 14, wherein a 3-axis lateral alignment is applied to ensure that the first tube and the second tube or the second tube and the third tubes are perfectly positioned.

16. The optical device as recited in claim 15, wherein chamfers around tube edges of the first, second or third tube are formed to provide better contact for the adhesive.

17. The optical device as recited in claim 12, wherein the first tube fixed on the dual fiber pigtail is used to ensure that the first lens is in no contact with any physical objects but protected by the second tube.

18. The optical device as recited in claim 17, wherein the first lens is a GRIN lens, and the second lens is a C-lens.

19. The optical device as recited in claim 12, wherein the first assembly further includes another tube besides the first tube, the first tube is used to support the first lens while the another tube is different from the first tube in diameter.

20. The optical device as recited in claim 19, wherein the filter is a composite filter formed by more than one filter coatings on one or more substrates to achieve desired optical characteristics.

* * * * *